June 15, 1926.  
T. FRÖHLICH  
1,588,402  
FILTERING APPARATUS  
Filed Sept. 23, 1921   2 Sheets-Sheet 1
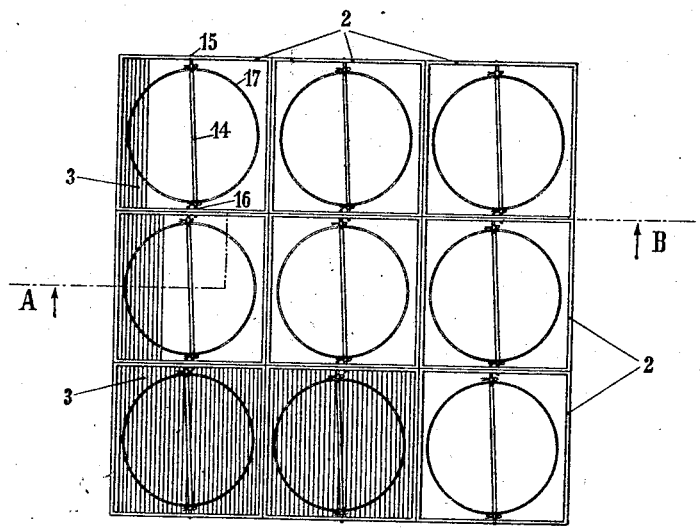
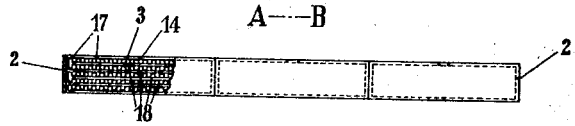
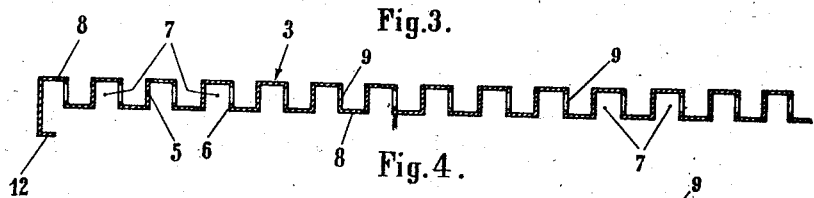
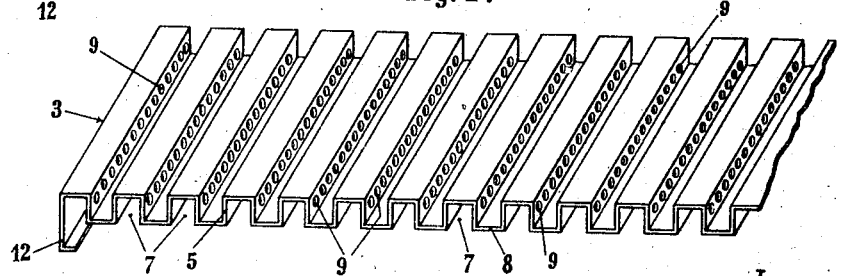
Inventor:  
Theodor Fröhlich  
By his Attorney Inventor:
Theodor Fröhlich
By his Attorney Patented June 15, 1926.

1,588,402

UNITED STATES PATENT OFFICE.

THEODOR FRÖHLICH, OF BERLIN, GERMANY, ASSIGNOR TO DEUTSCHE LUFTFILTER BAUGESELLSCHAFT MIT BESCHRAENKTER HAFTUNG, OF BERLIN, GERMANY, A FIRM.

FILTERING APPARATUS.

Application filed September 23, 1921, Serial No. 502,725, and in Germany September 23, 1920.

My invention relates to improvements in filters such as are used for separating foreign matter from air, gas, vapours, liquids, and other fluids, for example for separating or regenerating dust, for separating water or oil from vapours and liquids, for condensing steam and for cooling purposes. One of the objects of the improvements is to provide a filter of this type which can easily be manipulated, and in which the efficiency is not impaired by the deposit reducing the active filtering area. With this object in view my invention consists in composing the filter from one or more elements made from foraminated sheet metal or the like for conducting the fluid along curved paths. Said elements are so constructed that the area of the passages of the fluid remains uniform, and that a shaking of the filter during the operation does not cause obstruction of the passages by the deposit falling from the walls of the elements, such shaking having a favourable action by removing the deposit from the walls of the filters and improving the separating power thereof. An important feature of my invention resides in providing the filtering elements with apertures for the passage of the fluid therethrough and disposing the walls thereof in such a way relatively to the apertures as to provide bouncing surfaces for the fluid adapted suddenly to deflect the fluid from the direction of its path, so that the foreign matter is thrown against said surfaces, while the fluid continues its path through the filters. In a preferred construction the filtering elements are formed to provide channels having apertures in their side walls and adapted in some cases to remove the foreign matter, while filtering is continued. In such cases the filtering elements are in the form of plates having substantially parallel depressions and projections of suitable cross-sections for example in the form of triangles, trapeziums, rectangles, waves or other figures, the edges of said figures being in some cases rounded.

Another feature of my invention resides in combining a plurality of the said plates within individual frames all of the same size and providing separate filtering members.

Another feature of the invention resides in constructing the filtering elements in such a way, that they can be mounted within a frame only in the correct positions relatively to each other, the elements being disposed so that the fluid flows through the successive filtering elements substantially in one general direction, and that the direction of the flow of the fluid passing through the elements is continually changed.

Finally a feature of my invention resides in providing spacing members between the successive elements for holding the same in position within the frames and insuring the desired flow of the fluid.

For the purpose of explaining the invention several examples embodying the same have been shown in the accompanying drawings, in which the same reference characters have been used in all the views to indicate corresponding parts. In said drawings:—

Fig. 1 is a front view of the apparatus,

Fig. 2 is a cross-section taken on the line A—B of Fig. 1,

Fig. 3 is a cross-section showing a part of the filtering element on an enlarged scale, Fig. 4 is a perspective view of the filtering element.

Figure 5:
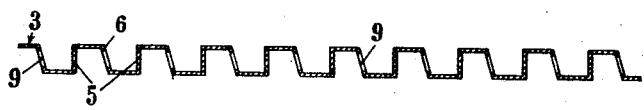
Figs. 5 and 6 are cross-sections showing modifications of the filtering element.

Referring at first to Figs. 1 and 2, the filter consists of several frames 2 of sheet metal or another suitable material and placed one beside the other within a frame, and each frame 2 contains one or more filtering elements 3 disposed in the direction of the flow of the fluid one behind the other. The number of the elements mounted in each frame depends on the result aimed at and of various conditions of the operation. As shown each frame comprises five elements, and each element consists of a plate made for example from sheet metal.

Preferred forms of the plates are shown in Figs. 3 to 6. As shown in Figs. 3 and 4 the plates are pressed into meander form so as to provide at opposite sides transverse depressions or channels and projections 7 and 8, the depressions being bounded by side walls 5 and 6. As shown the depressions and projections are substantially square in cross-section. The side walls 5 and 6 are alternately formed with apertures 9 which in the preferred form are circular, though I do not wish to be limited to this form. I prefer to provide a large number of round holes, because thereby the fluid is divided into streams from which the foreign matter is more readily separated than from a stream of large cross-section.

Figure 6:

The modifications shown in Figs. 5 and 6 are different from the one shown in Figs. 3 and 4 in that the depressions and projections are respectively in the form of trapeziums and triangles.

Figure 7:
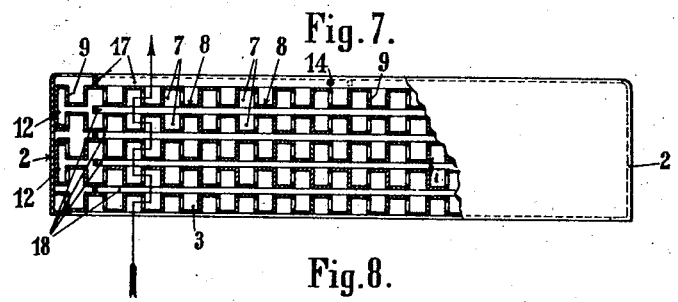
Fig. 7 is an end view partly in section showing a filtering member on an enlarged scale.

In Fig. 7 I have shown a preferred manner of mounting successive filtering elements relatively to each other, the construction shown in said figure being particularly effective. As shown the successive elements are so mounted that the depressions of the adjacent sides are in line with each other so as to provide separate chambers, and the apertures made in the side walls of the depressions are located in each chamber at the same side.

In order to insure the proper relative position of the filter elements I provide the same at one of their ends with depending flanges 12 fitting in the non-flanged ends of the adjacent elements, as is shown in Figs. 3, 4, and 7. Between adjacent elements I provide spacing members which in the examples shown in the figures are in the form of elastic rings 18. For holding the elements in position I provide braces at the outer faces of the elements which braces are in the form of rods 14. Preferably the ends 15 and 16 are reduced in cross-section as compared to the main portion of the rods, and said reduced ends are fitted in corresponding holes of the walls of the frames. As shown the rods are passed through corresponding holes made in outer circular members 17.

Figure 8:
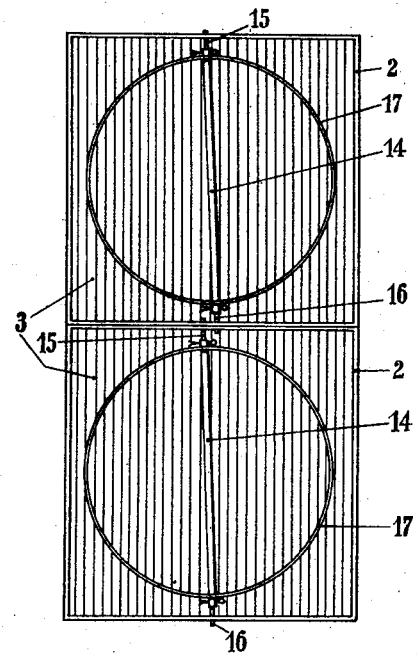
Fig. 8 is a front view of two filtering members.

The figures show the bracing member located at the face of the first element of each frame. If at one side of the frame the bracing rods are passed through the holes of the frame located at the right, they are passed at the opposite side through the holes located at the left, which results in the angular position of the braces shown in Figs. 1 and 8. If necessary the ends of the rods are passed through the corresponding holes of the side walls of the adjacent frames.

In the operation of the filter the elements are disposed transversely within a trunk for passing the fluid therethrough.

If Fig. 1 is assumed to be a front view of the filter, the depressions are disposed vertically. In some cases I prefer to dispose the depressions horizontally either by turning the filter to the right or left in Fig. 1, or by disposing the filtering surfaces horizontally, in which case Fig. 1 is a plan view of the filter. These modifications are preferred in such cases in which a suitable liquid is spread on the surfaces for more readily separating the foreign matter from the fluid. I have found that in case of horizontal depressions the liquid adheres more readily to the walls of the elements, and the operation of the filter is not impaired by the liquid flowing from the walls.

The operation of the filter is as follows: The fluid to be filtered is admitted to the filter from one side thereof, this being in Fig. 7 the bottom side. As the fluid passes through the set of lower depressions of the first element it is divided into broad streams. Each stream is deflected sidewise for flowing through the holes 9 made in the vertical walls of the element, where it is again divided into a great number of streams. The streams pass through the said apertures at increased velocity and they bounce against the opposing vertical walls which have no apertures, whereupon they are again deflected and move upwards at reduced velocity. The same operation is repeated as the fluid flows from the first chamber into the next one. I have found that by thus throwing the fluid against the side walls and deflecting the same at reduced velocity the foreign matter is rapidly separated, so that a comparatively small number of elements is necessary. For some purposes a single element will be sufficient.

My improved filter can be manufactured at low cost, and it can readily be cleaned. If desired the elements are zinced which can easily be done by reason of the small number of the elements. The individual elements can readily be cleaned, and the matter deposited on the walls can be regenerated together with the liquid used for wetting the walls.

While in describing the invention reference has been made to particular examples embodying the same, I wish it to be understood that my invention is not limited to the examples shown in the drawings, and that various changes may be made in the general arrangement of the apparatus and the construction of its parts without departing from the invention.

I claim:—

1. A filter comprising a plurality of rigid incombustible members, each consisting of successively recurrent walls, having in the alternate faces an opening, and several of said members having an extension at the ends thereof extending laterally of the adjacent member for disposing adjacent members into juxtaposition, the said openings guiding the fluid in a predetermined manner.

2. A filter comprising a plurality of rigid incombustible members, each consisting of successively recurrent walls, having in the alternate faces an opening, the said members forming cells and the said openings restricting the fluid flow, the cells allowing enlargements of the fluid flow, and spacer members interposed between successive members for spacing the members from contactual engagement with each other.

3. In a filter, a plurality of filtering members each consisting of a metal plate provided with a plurality of cells opening alternately on opposite sides of the plate and one of the common walls between adjacent cells having openings therein and the other opposed walls of said cells being imperforate whereby the fluid may pass in one direction only through the cell at one side of said plate into the cell at the opposite side thereof, and means for supporting said members in superposed spaced apart relation.

4. In a filter, a plurality of filtering members each consisting of a rigid metal plate bent to provide a plurality of cells therein with the alternate cells opening upon opposite sides of said plate and side walls separating the adjacent cells from each other, one of said side walls being imperforate and the other provided with openings therein, and means for mounting said filter plates in superposed relation with the corresponding cell walls having the openings therein positioned in the same plane whereby the fluid may pass in one direction only between adjacent cells of the same filter plate and be thereby caused to travel in a circuitous course from one side of the filter to the other.

5. A filter comprising a plurality of rigid incombustible members, each consisting of successively recurrent walls having in alternate faces an opening, and each member having means for holding it whereby adjacent members are disposed with the walls having openings therein in juxtaposition forming between the members a series of cells, each cell having inlet and outlet apertures on one side only thereof whereby the fluid flow through the filter will be divided into a plurality of separated paths through the cells which provide spaces for calming the air, and the sheltered portions of the cells arresting the separated dust therein.

6. A filter comprising a plurality of rigid incombustible members, each consisting of successively recurrent walls, having openings on their faces, and several of said members having an extension at the ends thereof extending laterally of the adjacent member for disposing adjacent members into juxtaposition, the said openings guiding the fluid in a predetermined manner.

7. In a filter, a plurality of filtering members each consisting of a sheet metal plate bent to provide a plurality of cells with the alternate cells opening upon opposite sides of the plate, one of the common side walls between adjacent cells being imperforate and the other side wall having openings therein, and means for supporting said plates in superposed spaced apart relation with the open sides of the cells in adjacent plates opposed to each other and providing dust collecting zones between the walls separating adjacent cells of the plates from each other, the fluid passing in one direction only between the adjacent cells of each plate and through the opposed cells of the adjacent plates in a circuitous course from one side of the filter to the other.

8. A filtering member for air and gas filters consisting of a rigid metal plate having a cellular structure and openings in spaced parts of said plate permitting passage of the fluid in one direction only from one cell thereof into but one of the two adjacent cells.

9. A filtering member for air and gas filters consisting of a rigid metal plate having a cellular structure and openings in spaced parts of said plate permitting passage of the fluid in one direction only from one cell thereof into but one of the two adjacent cells, and said plate having means at the margin thereof for mounting the plate in superposed spaced relation to a complementary filtering member.

In testimony whereof I hereunto affix my signature.

THEODOR FRÖHLICH.